(12) United States Patent
Tamer

(10) Patent No.: US 9,752,612 B1
(45) Date of Patent: Sep. 5, 2017

(54) STAY TIGHT THREADED FASTENERS

(71) Applicant: Albert Tamer, San Francisco, CA (US)

(72) Inventor: Albert Tamer, San Francisco, CA (US)

( * ) Notice: Subject to any disclaimer, the term of this patent is extended or adjusted under 35 U.S.C. 154(b) by 0 days.

(21) Appl. No.: 14/548,203

(22) Filed: Nov. 19, 2014

(51) Int. Cl.
*F16B 39/04* (2006.01)
*F16B 39/282* (2006.01)
*F16B 37/00* (2006.01)

(52) U.S. Cl.
CPC ............ *F16B 39/282* (2013.01); *F16B 37/00* (2013.01)

(58) Field of Classification Search
CPC ........ F16B 21/125; F16B 33/02; F16B 37/00; F16B 39/04; F16B 39/30; F16B 39/282
USPC ................ 411/317, 318, 383, 411, 417, 438
See application file for complete search history.

(56) References Cited

U.S. PATENT DOCUMENTS

| | | | | |
|---|---|---|---|---|
| 661,558 A * | 11/1900 | Shuff | ...................... | F16B 39/04 403/328 |
| 727,152 A * | 5/1903 | Kimball | .................. | F16B 39/04 411/317 |
| 838,558 A * | 12/1906 | Magill et al. | ........... | F16B 39/04 411/317 |
| 983,540 A * | 2/1911 | Corliss | .................... | F16B 39/04 411/317 |
| 1,355,342 A * | 10/1920 | Kellogg | .................. | F16B 39/32 411/327 |
| 1,560,616 A * | 11/1925 | Stallard | ................... | F16B 39/32 411/294 |
| 1,703,947 A * | 3/1929 | Nation | .................... | F16B 39/32 411/329 |
| 1,739,410 A * | 12/1929 | Murphy | .................. | F16B 39/32 411/328 |
| 1,798,604 A * | 3/1931 | Hoke | ...................... | F16B 39/30 411/222 |
| 1,807,494 A * | 5/1931 | Proctor | .................. | F16B 39/30 411/259 |
| 1,905,869 A * | 4/1933 | Hoke | ...................... | F16B 39/30 411/222 |
| 2,372,888 A * | 4/1945 | Duggan | .................. | F16B 39/04 411/318 |
| 3,362,281 A * | 1/1968 | Finlay | ................... | F16B 37/122 411/395 |
| 5,234,291 A * | 8/1993 | Swemmer | ........... | E21D 21/0026 405/259.1 |
| 8,696,284 B2 * | 4/2014 | Aicher | ..................... | E04C 5/03 405/259.1 |

(Continued)

*Primary Examiner* — Roberta Delisle

(57) ABSTRACT

A male fastener, female fastener, and a wedge that is adapted to secure the female fastener to the male fastener, and to prevent unwanted loosening of the female fastener from the male fastener. The male fastener includes a shaft that may optionally include a plurality of protruding elements that extend outwardly from an external surface of the shaft. The protruding elements may be radially positioned in rows around a circumference of the shaft, to create a channel between the rows of protruding elements. The channel is adapted to receive a corresponding thread located within an aperture of the female fastener. The wedge is adapted to be inserted into a space located between a set of protruding elements (or into multiple spaces located between multiple protruding elements). The wedge prevents the female fastener from rotating around the shaft in a direction towards the bottom portion of the male fastener.

7 Claims, 7 Drawing Sheets

(56) References Cited

U.S. PATENT DOCUMENTS

2013/0209192 A1* 8/2013 Wood .................. E21D 21/004
                                                    411/82

* cited by examiner

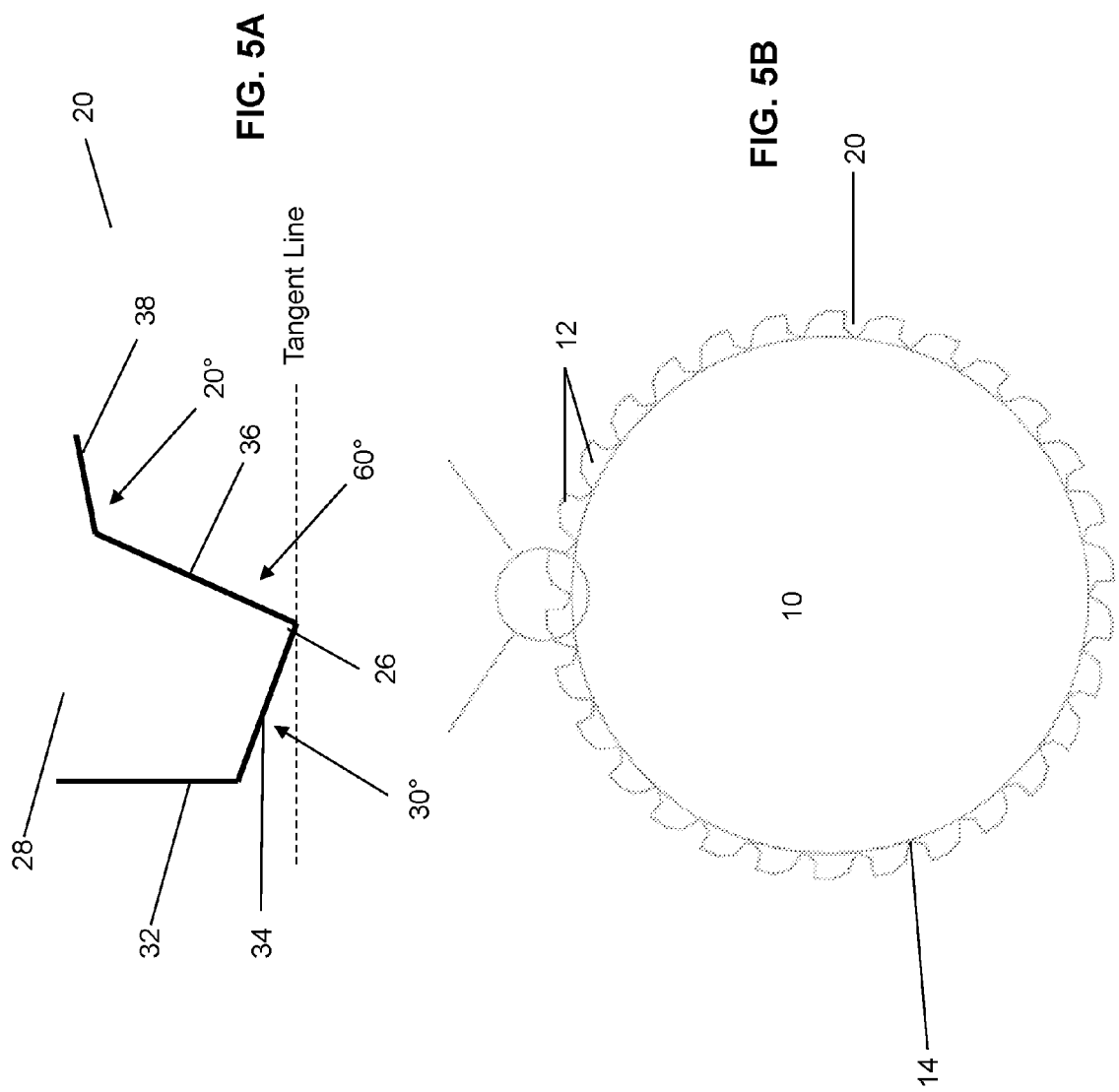

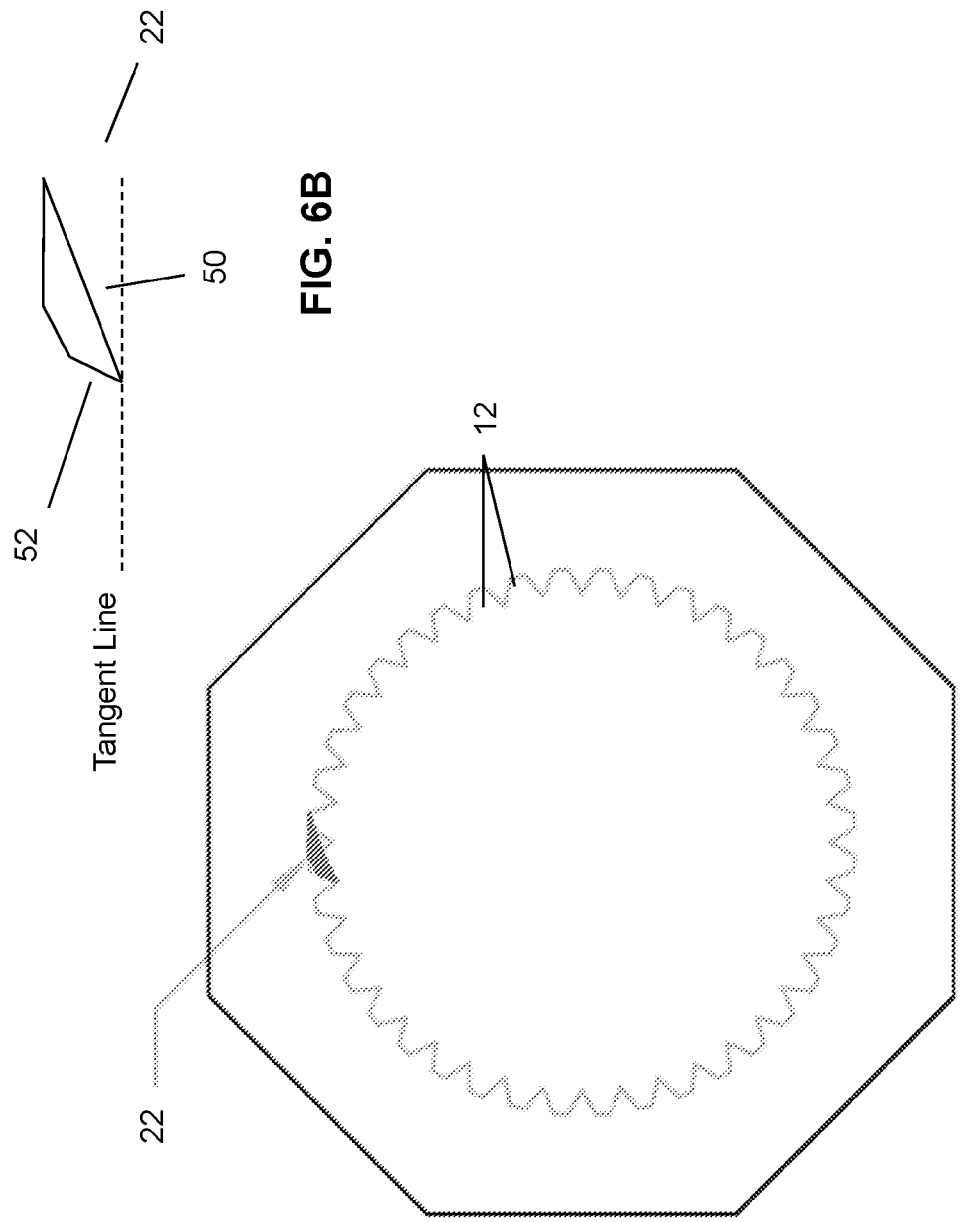

STAY TIGHT THREADED FASTENERS

FIELD OF THE INVENTION

The field of the present invention relates to male and female threaded fasteners, including all variations of bolts, machine screws, and nuts. More particularly, the field of the present invention relates to threaded male and female fasteners that are used to hold different objects together, which are configured to avoid unwanted loosening of the male and female fasteners from each other.

BACKGROUND OF THE INVENTION

Male and female threaded fasteners, such as bolts and machine screws (along with corresponding nuts), are used in a variety of applications today, most often to connect and secure two or more pieces or items together. Indeed, for many years, male and female threaded fasteners have been used in residential and commercial construction, complex machine construction, and many other industries. A frequent and long-standing problem with male and female threaded fasteners is the unwanted (and sometimes dangerous) loosening of a female fastener (e.g., a nut) along the shaft of a corresponding male fastener (e.g., a screw or bolt), which may be caused by vibration, lubrication, thermal expansion and shrinkage, and other external forces. For example, when a screw/bolt and nut combination is incorporated into a complex machine that undergoes periodic vibrations, such vibrations will often cause the nut (over time) to loosen and travel along the threaded axis of the screw/bolt—in a direction that ultimately loosens the nut and screw/bolt combination, thereby loosening the two pieces that are connected together through such screw/bolt and nut combination.

Accordingly, there continues to be a demand in the marketplace for improved male and female threaded fasteners. More particularly, there continues to be a demand for improved male and female threaded fasteners, which are resistant to unwanted loosening over time. As the following will demonstrate, the invention described herein addresses such demands in the marketplace (as well as others).

SUMMARY OF THE INVENTION

According to certain aspects of the invention, male and female threaded fasteners are provided, such as screws, bolts, nuts, etc., which incorporate or are adapted to be used with certain wedge components. The male fasteners are adapted to be secured and connected to female fasteners in a manner that avoids unwanted loosening of the female fasteners from the male fasteners, e.g., as a result of vibrations or other forces over time. As used herein, the term "screw(s)" and "bolt(s)" are used interchangeably, and should both generally be construed to refer to a threaded male fastener, e.g., a male threaded component that is adapted to be received by, and to be connected to, a female threaded fastener (e.g., a nut). More particularly, the male fasteners (e.g., screws and bolts) will include a rigid shaft, which is configured to be disposed through and rotated within an aperture located in the middle of a female fastener (e.g., a nut). As used herein, the term "female fastener" refers to a component that includes a threaded aperture, which is configured to receive the corresponding threaded shaft of the male fastener. As used herein, a female fastener may comprise a separate object, e.g., a nut, or the female fastener (with its threaded aperture) may be incorporated into and form a part of a larger object.

In the broadest sense, the invention provides that the shaft of the male fastener will include one or more channels that are adapted to receive a corresponding wedge located within or in proximity of an aperture of a female fastener. The threads of the female fastener (located within the aperture thereof) will be configured to engage the channels of the male fastener, such that the female fastener may be rotated in a way that causes the female fastener to travel towards the top of the male fastener along its shaft (i.e., to "tighten" the female fastener). After the female fastener is sufficiently "tightened," the wedge (located within or in proximity of the aperture of the female fastener) may be disposed into a channel (or other area) of the shaft of the male fastener (at or near the bottom surface of the female fastener), such that the wedge prevents the female fastener from "loosening" by rotating around the shaft in a direction that causes the female fastener to travel away from the top of the male fastener along its shaft.

According to certain specific embodiments, the shaft of the male fastener may comprise a series of protruding elements. In such embodiments, the invention provides that the protruding elements are preferably spaced equally part. The equally spaced protruding elements form a void (or space), between each protruding element. The invention provides that this resulting space is adapted to receive the wedge component. In this embodiment, as in the embodiment described above, the invention further provides that the wedge is configured to prevent the female fastener from rotating around the shaft in a manner that causes the female fastener to move in a direction towards the bottom portion of the male fastener (i.e., it is configured to prevent the female fastener from rotating in a counter-clockwise direction, which would otherwise loosen the female fastener).

According to further aspects of the present invention, sets of male and female threaded fasteners (e.g., screws and nuts), as described above, are included. In such embodiments, the wedge may be incorporated into the female fasteners or, alternatively, the wedge may exist as a separate component.

According to yet further aspects of the present invention, sets of male and female threaded fasteners (e.g., screws and nuts) and the wedges described herein are included. Similar to the other embodiments of the present invention, the wedge may be incorporated into the female fasteners or, alternatively, the wedge may exist as a separate component.

The above-mentioned and additional features of the present invention are further illustrated in the Detailed Description contained herein.

BRIEF DESCRIPTION OF THE FIGURES

FIG. 5 is a cross-sectional view of another embodiment of a space located between the protruding elements described herein.

FIG. 6 is a cross-sectional view of the shank of a male fastener, in which the space (located between two protruding elements) illustrated in FIG. 5 is located.

DETAILED DESCRIPTION OF THE INVENTION

Figure 1:
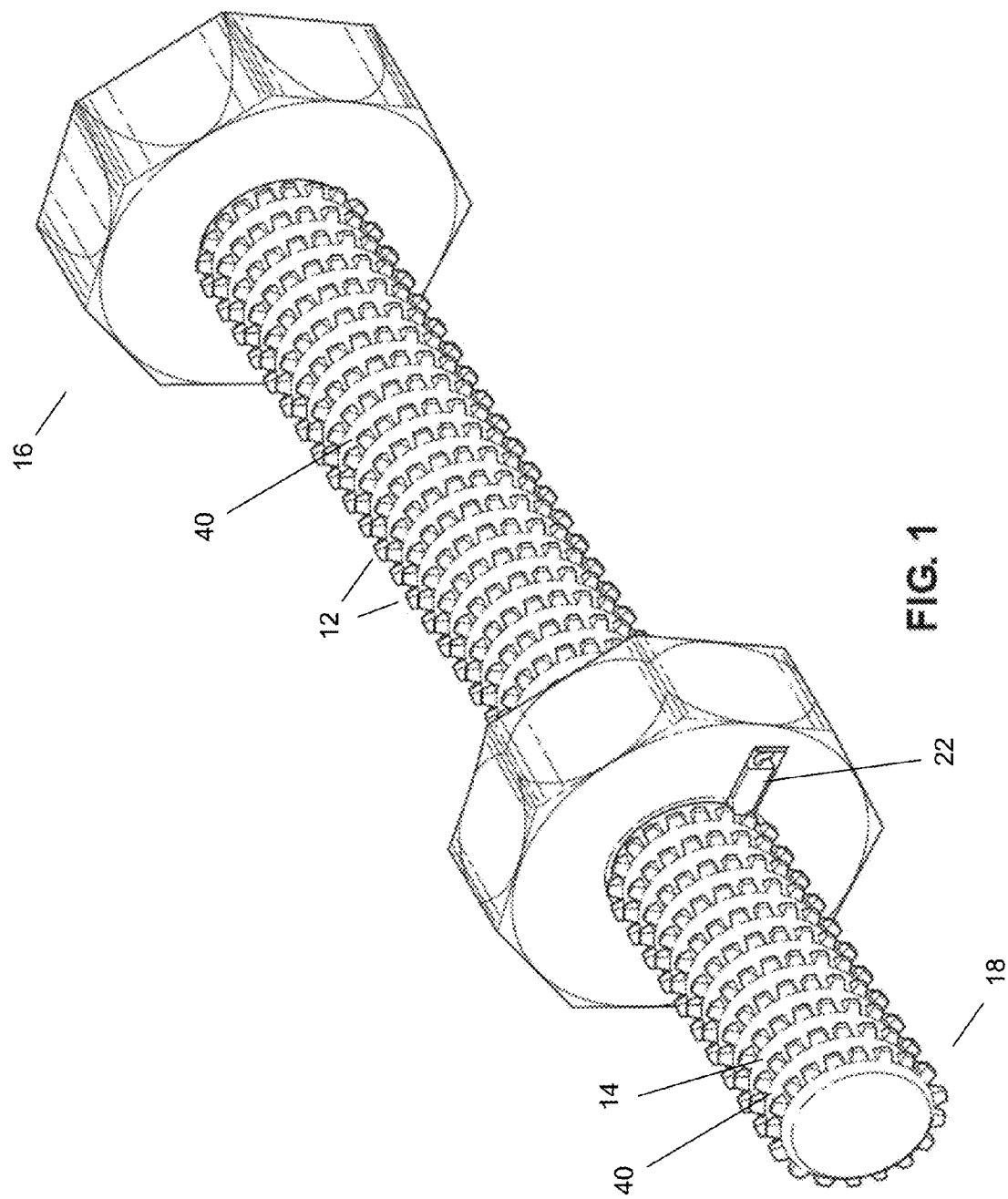
FIG. 1 is a perspective view of the male and female fastener (screw/nut) combination described herein.
Figure 2:
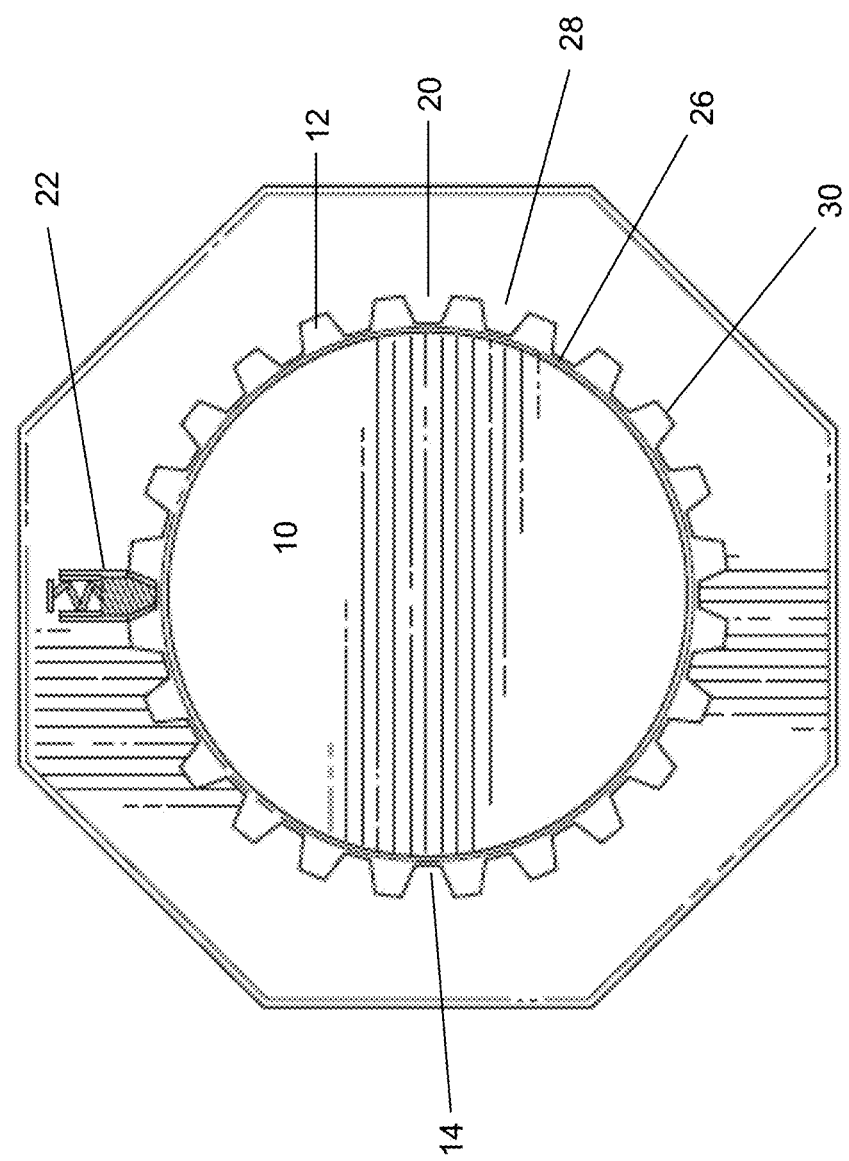
FIG. 2 is a top view of the male and female fastener combination described herein.
Figure 3:
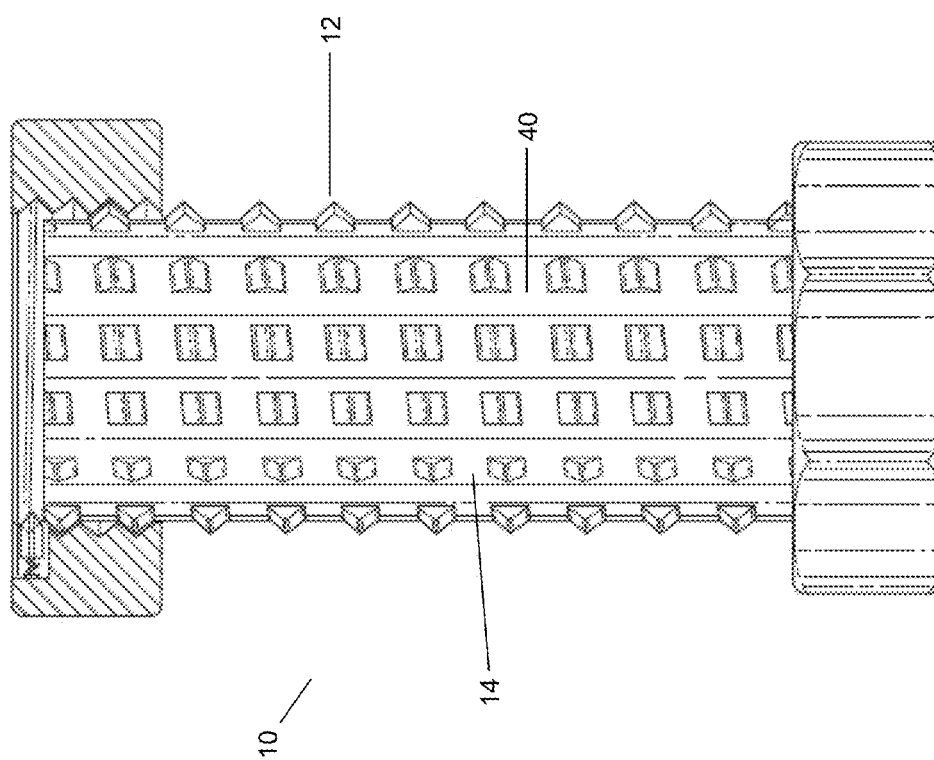
FIG. 3 is a side view of a male and female fastener combination described herein.
Figure 4:
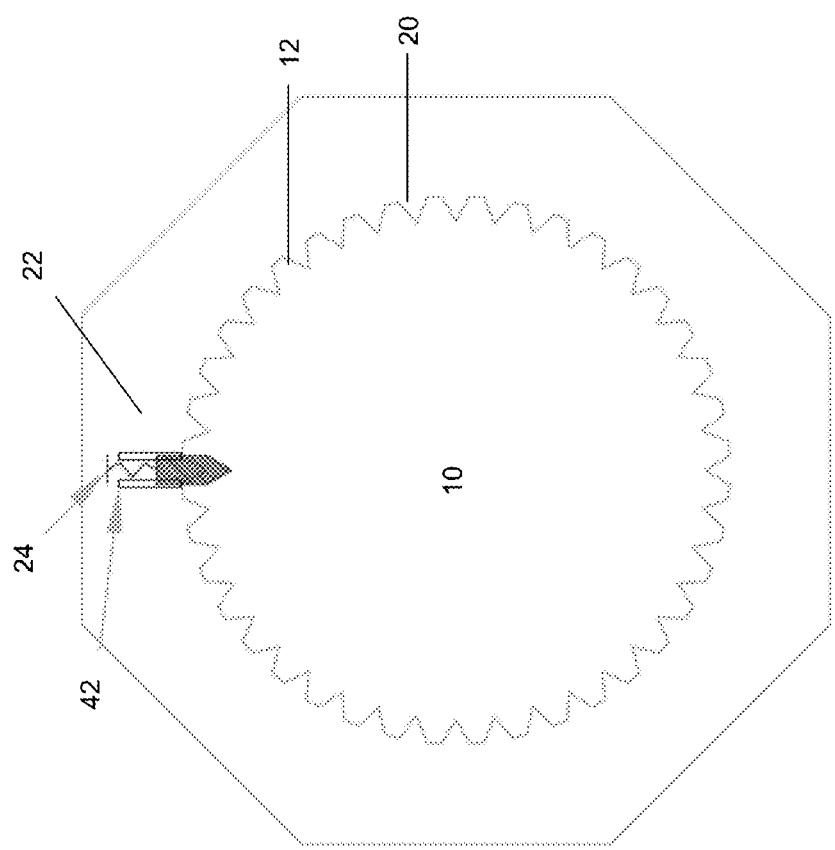
FIG. 4 is a cross-sectional view of a male and female fastener combination described herein, showing a wedge being used to secure the female fastener in place.
Figure 8:
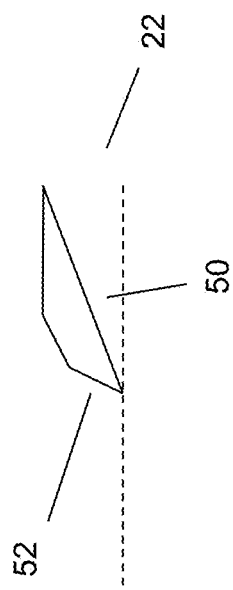
FIG. 8 is an enlarged view of the wedge shown in FIG. 7.
Figure 7:
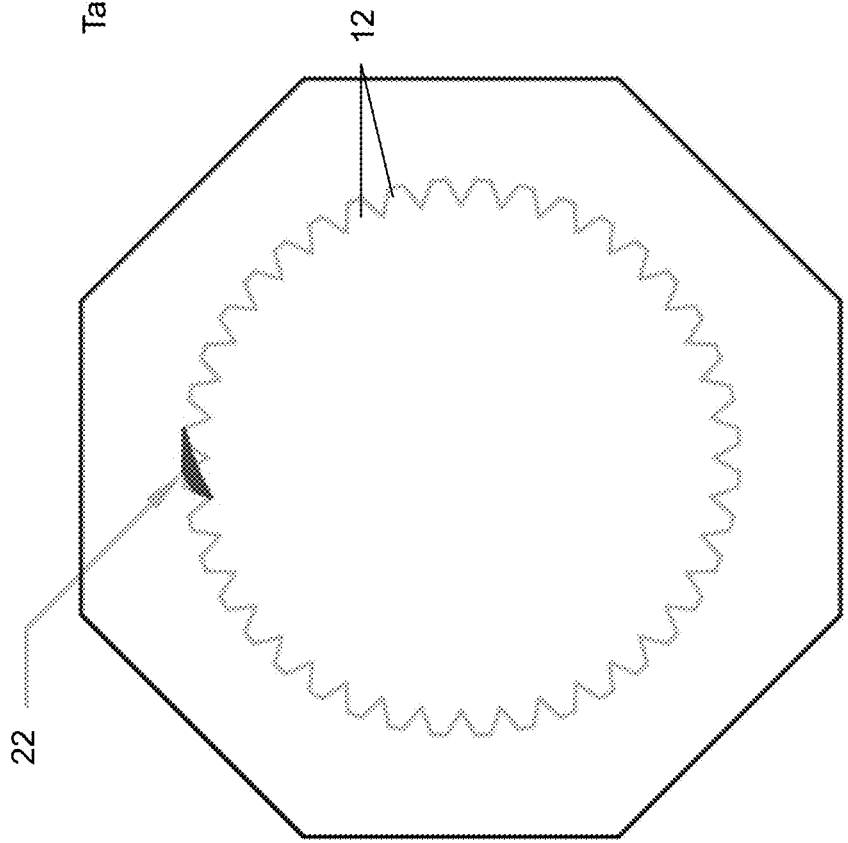
FIG. 7 is a cross-sectional view of a male and female fastener combination described herein, showing a wedge (which is integrally formed with an interior surface of the female fastener) being used to secure the female fastener in place.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-8, according to certain preferred embodiments of the present invention, male and female threaded fasteners are provided, such as screws, bolts, nuts, etc., which incorporate or are adapted to be used with certain wedge components. The female fasteners (e.g., nuts) are adapted to be secured to the male fasteners (e.g., screws/bolts) in a manner that avoids unwanted and potentially dangerous loosening of such female fasteners from the male fasteners, e.g., as a result of vibrations or other forces over time. The invention provides that the male fasteners of the present invention are adapted to be received by and connected to a female fastener. More particularly, the male fasteners will include a rigid (and, in some cases, cylindrical) shaft 10, which is configured to be disposed through and rotated within an aperture located in the middle of a female fastener (e.g., a nut), such that the channels (described below) on the shaft 10 of the male fasteners are allowed to receive and engage corresponding threads located within an aperture of the female fasteners.

When defined broadly, according to certain preferred embodiments, the invention encompasses male fasteners (e.g., screws/bolts) and female fasteners (e.g., nuts), as described herein, along with a wedge 22 that can be used to lock the female fasteners in place, so that the female fasteners (e.g., nuts) are prevented from "loosening" and rotating in a counter-clockwise direction about the shafts of male fasteners. In such embodiments, the wedge 22 may be configured to exist within or in proximity of the bottom surface of the female fastener (e.g., the nut)—or, as described below, the wedge 22 may be integrally formed with the outward facing surface of the aperture of the female fastener (nut). The wedge 22 may be configured to be inserted into one or more channels 40 of the shaft 10—or, alternatively, one or more other cavities located along the axis of the shaft 10 that is configured to receive the wedge 22. Importantly, the wedge 22 will be configured to allow the female fastener (nut) to be rotated in a manner (e.g., in a clockwise direction) that allows the female fastener (nut) to travel towards the top of the male fastener (screw/bolt) along its shaft 10, in order to "tighten" the female fastener (nut) to the male fastener (screw/bolt), while being configured to prevent the female fastener (nut) from rotating in a manner (e.g., in a counter-clockwise direction) that allows the female fastener (nut) to travel away from the top of the male fastener (screw/bolt) along its shaft 10, which would otherwise "loosen" the female fastener (nut).

According to certain specific embodiments of the present invention, the shaft 10 of the male fasteners may include a plurality of protruding elements 12 that extend outwardly from the external surface 14 of the shaft 10. The invention provides that the protruding elements 12 are radially positioned in a spiral around the circumference of the shaft 10. In addition, the rows of protruding elements 12 are positioned and oriented in a way to create a channel 40 between the rows of protruding elements 12. This resulting channel 40 radially travels and wraps around (in a spiral fashion) the circumference of the shaft 10, beginning at or near the top portion 16 of the male fastener and terminating at or near the bottom portion 18 of the male fastener. The invention provides that the channel 40 is adapted to receive a corresponding thread (or set of threads) located within an aperture of the female fastener. This way, the threads of the female fastener may engage the channel 40, such that the female fastener may be rotated (clockwise) in a way that causes the female fastener to travel towards the top 16 of the male fastener along its shaft 10 (i.e., to "tighten" the female fastener). Of course, when placed into use, the shaft 10 of the male fastener will be disposed through an aperture located in another item (or located in multiple items), with the female fastener then being applied and rotated about the shaft 10, such that the item (or multiple items) will be located between a top 16 of the male fastener and the female fastener.

The invention provides that the protruding elements 12 are preferably spaced equidistantly apart. The equally spaced protruding elements 12 form a void or cavity (i.e., a space) 20, between each protruding element 12. The invention provides that this resulting space 20 is adapted to form another channel that is parallel to the long axis of the male fastener to receive a wedge 22 (or, alternatively, the wedge 22 may be configured to be inserted into multiple spaces 20). More particularly, the invention provides that the outer dimension of the wedge 22 will be configured to be inserted into, and to nestably mate with, one or more spaces 20. When the wedge 22 is inserted into one or more spaces 20, the wedge will function to prevent the female fastener from rotating around the shaft 10 (in a counter-clockwise fashion), such that the female fastener is prevented from traveling in a direction towards the bottom portion 18 of the male fastener. More particularly, when the wedge 22 is inserted into one or more spaces 20, the wedge 22 is configured to prevent the female fastener from rotating in a counter-clockwise direction (which would otherwise cause the female fastener to travel along the shaft 10 towards the bottom portion 18 of the male fastener, which would loosen the female fastener (relative to the item(s) that the male and female fasteners are securing)). As mentioned above, in certain embodiments, the wedge 22 may be configured to span across, and be inserted into, multiple spaces 20 located along the shaft 10 of the male fastener at the same time—which creates enhanced resistance to prevent the female fastener from rotating in a counter-clockwise direction about the shaft 10 of the male fastener.

According to certain preferred embodiments, the invention provides that the wedge 22 may optionally be equipped with a spring 24, whereby the spring 24 exerts a constant force that pushes the wedge 22 into the space 20 located between two protruding elements 12. The invention provides that the spring 24 may reside between two solid guiding walls 42, which form a part of the wedge 22. Still further, according to certain embodiments, the invention provides that the wedge 22 may be incorporated within (and made a part of) the female fastener, as illustrated in FIG. 1. In such embodiments, the wedge 22 may be flush with an outer surface of the female fastener, such that the wedge 22 may be manually accessible from an external (outer/bottom) surface of the female fastener, such that (if desirable) the wedge 22 may be manually pulled out of the space 20, in order to allow the female fastener to freely rotate about the shaft 10 of the male fastener in a counter-clockwise (loosening) fashion, i.e., to cause the female fastener to travel towards the bottom portion 18 of the male fastener.

According to certain preferred embodiments, the invention provides that the space 20 located between each of the protruding elements 12 will include a first area 26 adjacent to the external surface 14 of the shaft 12, and a second area 28 that is contiguous with a top portion 30 of the protruding elements 12. The invention provides that the first area 26 of the space 20 will preferably include less volume (and will exhibit a smaller dimension) than the second area 28 of the space 20. This configuration creates a space 20 that is widest at the second area 28 that is contiguous with a top portion 30 of the protruding elements 12, and narrows as the space 20 approaches the first area 26 adjacent to the external surface 14 of the shaft 12. In such embodiments, the wedge 22 will exhibit a corresponding outer dimension. More particularly, the tip of the wedge 22—which is inserted into the space 20—will comprise an area that narrows as it approaches the end (tip) of the wedge 20 that is inserted into the space 20 and will reside adjacent to the external surface 14 of the shaft 12.

According to yet further embodiments of the present invention, the plurality of protruding elements 12 may be configured to impart more resistance on movement of the wedge 22 in one direction versus the other. More particularly, in such embodiments, the protruding elements 12 may be configured to impart more resistance on movement of the wedge 22 from one space 20 to another adjoining space 20 when such movement is to the left (or counter-clockwise direction), compared to the amount of resistance that is applied when the wedge 22 is moved from one space 20 to another adjoining space 20 to the right (or clockwise direction). In other words, the plurality of protruding elements 12 may be configured to impart more resistance on (or to prevent) movement of the wedge 22 to a space 20 located to the left (such that the female fastener would not be allowed to rotate in a counter-clockwise fashion and loosen), compared to a lesser amount of resistance that is applied to movement of the wedge 22 to a space 20 located to the right (such that the female fastener would be allowed, with minor force, to rotate in a clockwise fashion and to be tightened).

According to such embodiments, each space 20 located between each protruding element 12 will preferably include four surfaces, with the four surfaces being formed by the protruding elements 12 on each side of the space 20. More specifically, and referring to FIG. 5, the space will include a first (left) surface 32 that is positioned perpendicular to a line that runs tangential to the external surface 14 of the shaft 10. According to such embodiments, the second surface 34 is contiguous with the first surface 32, and the second surface 34 is positioned at about a 30-degree angle to the line that runs tangential to the external surface 14 of the shaft 10. According to such embodiments, a third surface 36 is contiguous with the second surface 34, with the third surface 36 being positioned at about a 60-degree angle to the line that runs tangential to the external surface 14 of the shaft 10. Finally, according to such embodiments, the fourth surface 38 will be contiguous with the third surface 36, and the fourth surface 38 will be positioned at about a 20-degree angle to the line that runs tangential to the external surface 14 of the shaft 10. These four surfaces —32, 34, 36, and 38—will collectively form each space 20. The invention provides that the orientation of the first surface 32—being perpendicular to a line that runs tangential to the external surface 14 of the shaft 10—will be effective to strongly resist (or prevent) unwanted movement of the wedge 22 to a space 20 located to its left, i.e., it will strongly resist (or prevent) the ability of the wedge 22 and female fastener from rotating in a counter-clockwise fashion (which would otherwise loosen the female fastener). In contrast, the slope created by the angles of the third surface 36 and fourth surface 38 will permit the wedge 22 to slidably move to a space 20 located to its right with much less resistance, such that the wedge 22 and female fastener may be rotated in a clockwise fashion in order to tighten the female fastener.

In still further embodiments, the invention provides that the wedge 22 may be integrally formed with the outward facing (threaded) surface of the aperture of the female fastener (FIG. 6). In these embodiments, the wedge 22 will preferably exhibit a sloped surface 50 that is configured to permit the wedge 22 (and the connected female fastener) to rotate about the shaft 10 of the male fastener in a clockwise direction with minimal force, such that the wedge 22 will not interfere with the female fastener being rotated and "tightened," e.g., the slope of surface 50 will preferably be less than 45-degrees relative to a line that runs tangential to the external surface 14 of the shaft 10 (and the top or tip of surface 50 will preferably be sufficiently long to rest on top of an adjacent protruding element 12, so that surface 50 will be allowed to glide over the protruding elements 12 when the female fastener is rotated clockwise). In addition, the wedge 22 will further exhibit a surface 52 (or a portion of surface 52) that is positioned greater than 45-degrees to a line that runs tangential to the external surface 14 of the shaft 10, such that the surface 52 of the wedge 22 (and the connected female fastener) are prevented from rotating about the shaft 10 of the male fastener in a counter-clockwise direction, which would otherwise "loosen" the female fastener.

According to further aspects of the present invention, sets of male and female fasteners (as described above) are included. In such embodiments, the wedge 22 may be incorporated into such female fasteners or, alternatively, the wedge 22 may exist as a separate component. According to yet further aspects of the present invention, sets of male fasteners, female fasteners, and the wedges 22 described herein are included. Similar to the other embodiments of the present invention, the wedge 22 may be incorporated into such female fasteners or, alternatively, the wedge 22 may exist as a separate component. The invention provides that the male fasteners, female fasteners, and wedges 22 described herein may be comprised of any suitably rigid materials, such as steel, iron, plastics, and others.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A male fastener, a female fastener, and a wedge, whereby the male fastener is adapted to be received by and connected to a female fastener, wherein:
   (a) the male fastener comprises a rigid shaft, which includes a channel that radially travels around a circumference of the shaft from a top portion of the male fastener to a bottom portion of the male fastener, wherein the channel is adapted to receive a corresponding thread located within an aperture of the female fastener; and
   (b) the wedge is located within or adjacent to a bottom surface of the female fastener or integrally formed with a surface of the aperture of the female fastener, wherein the wedge is configured to make contact with an external surface of the shaft of the male fastener and to prevent the female fastener from rotating around the shaft in a direction that causes the female fastener to move towards the bottom portion of the male fastener, and wherein:
   (i) the wedge is further configured to permit the female fastener to rotate around the shaft in a direction that causes the female fastener to move towards the top portion of the male fastener,
   (ii) the shaft of the male fastener comprises a series of protruding elements;
   (iii) the protruding elements are radially positioned in rows around the circumference of the shaft and are positioned to create the channel, located between the rows of protruding elements, which radially travels around the circumference of the shaft from the top portion of the male fastener to the bottom portion of the male fastener;
   (iv) the protruding elements are spaced equally apart, wherein a space is formed between each protruding element, wherein the wedge is adapted to be inserted into the space or multiple spaces located between multiple protruding elements;
   (v) the space located between each protruding element includes a first area adjacent to the external surface of the shaft and a second area that is contiguous with a top portion of the protruding elements, wherein the first area of the space comprises less volume than the second area of the space;
   (vi) the wedge is incorporated within the female fastener, and may be manually accessed from an external surface of the female fastener;
   (vii) the wedge comprises a spring that exerts a constant force that pushes the wedge into the space located between two protruding elements; and
   (viii) the plurality of protruding elements are configured to impart resistance on movement of the wedge from a first space located between two protruding elements to an adjoining second space located between two protruding elements, wherein such resistance is greater when the second space is located left of the first space, relative to when the second space is located right of the first space.

2. The male fastener, female fastener, and wedge of claim 1, wherein each space located between each protruding element includes four surfaces, which are formed by a protruding element on each side of the space, wherein:
   (a) a first surface is positioned perpendicular to a line that runs tangential to the external surface of the shaft;
   (b) a second surface is contiguous with the first surface, and the second surface is positioned at a 30-degree angle to the line that runs tangential to the external surface of the shaft;
   (c) a third surface is contiguous with the second surface, and the third surface is positioned at a 60-degree angle to the line that runs tangential to the external surface of the shaft; and
   (d) a fourth surface is contiguous with the third surface, and the fourth surface is positioned at a 20-degree angle to the line that runs tangential to the external surface of the shaft.

3. The male fastener, female fastener, and wedge of claim 2, wherein the male fastener is a screw and the female fastener is a nut.

4. The male fastener, female fastener, and wedge of claim 2, wherein the male fastener is a bolt and the female fastener is a nut.

5. The male fastener, female fastener, and wedge of claim 2, wherein the wedge is attached to the female fastener.

6. The male fastener, female fastener, and wedge of claim 2, wherein the wedge is not attached to the female fastener.

7. The male fastener, female fastener, and wedge of claim 2, wherein the wedge is integrally formed with the female fastener.

* * * * *